Patented Dec. 17, 1940

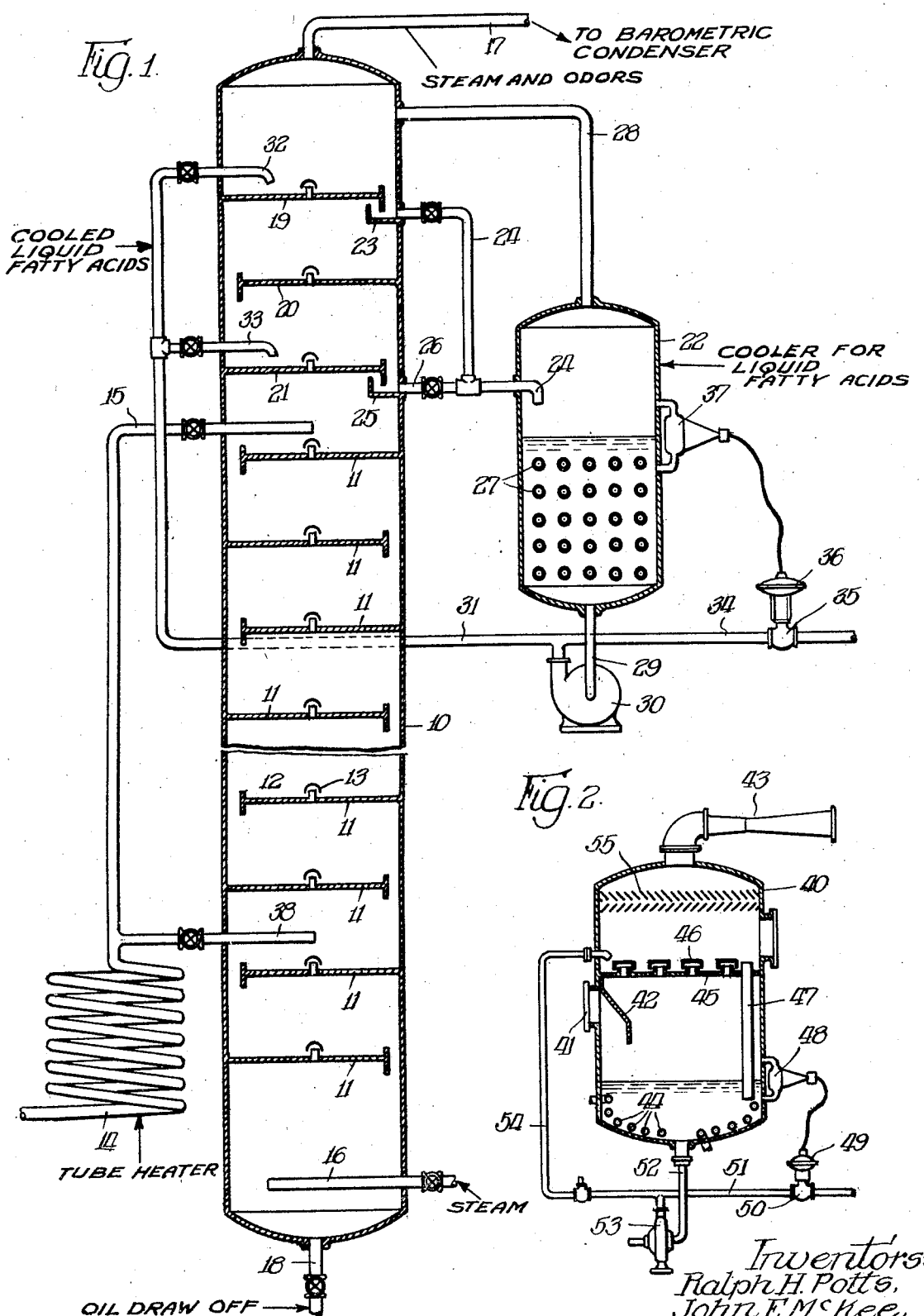

2,224,986

UNITED STATES PATENT OFFICE 2,224,986

FATTY ACID TREATMENT

Ralph H. Potts, La Grange, and John E. McKee, Western Springs, Ill., assignors to Armour and Company, Chicago, Ill., a corporation of Illinois Application March 5, 1938, Serial No. 194,050

4 Claims. (Cl. 202—46)

This invention relates to an improved process and apparatus for the treatment of vegetable, animal and marine oils containing fatty acids, and has particular reference to the separation of volatile constituents from such materials, including the removal of odor-imparting substances therefrom.

As described in our copending application Serial No. 96,732, filed August 19, 1936, of which the present application is a continuation in part, it has been found highly advantageous to subject fatty acid mixtures of a process for separating the mixtures into volatile fractions having different boiling points. This procedure involves heating the oleaginous materials, distilling the volatile portions thereof in a bubble tower, condensing the vapors and returning the condensed vapors to the upper portion of the tower in cooled, liquid condition.

The present invention has as its principal object an improvement in processes of this general type in which the fatty acid mixtures are subjected to distillation and the cooled distillate is returned to the process, the invention including an improved deodorization process for use in fractionating systems as well as in the straight run distillation of fatty acids from oleaginous materials.

An additional object of the invention is the provision of a process and apparatus for the distillation of fatty acids in which previously condensed fatty acids are subjected to a separate cooling operation and then are employed for the condensation of fatty acid vapors and removal of odor-imparting constituents.

Still another object of the invention is to provide a method and apparatus for the continuous refining and deodorization of fatty acid-containing vegetable, marine and animal oleaginous materials.

A further object of the invention is the provision of an improved process and apparatus for the purification of triglycerides containing relatively small quantities of fatty acids and odor-imparting volatile substances.

These and other objects of the invention will be evident upon a consideration of the following description of a preferred embodiment of the invention and by reference to the accompanying drawing, in which Fig. 1 is a somewhat diagrammatic view in section showing apparatus for the continuous treatment of oleaginous materials in accordance with the invention; and Fig. 2 is a view of apparatus particularly adapted for the batch refining and deodorization of vegetable oils.

A principal application of the improved process and apparatus is in the deodorization of oleaginous materials of the triglyceride type containing a relatively small quantity of free fatty acids of the volatile type and odor-imparting constituents. The treatment includes removal of the fatty acids and the odor-imparting constituents to leave a relatively pure, edible oil. The invention likewise is applicable to the removal of odors during the separation of fatty acids into volatile constituents, as described in our copending application and in our prior patent.

Raw vegetable oils generally contain a small percentage of free fatty acids which are objectionable where the oil is to be used for edible purposes. Also, the oil usually has some odor-imparting constituents of a relatively low boiling nature.

In the apparatus shown in Fig. 1 the column 10 contains a series of vertically spaced bubble plates 11 having down spouts 12 and bubble caps 13 of conventional construction. A column of this sort can be used for the straight distillation of fatty acids or it can be used in the fractionation of the fatty acids into products of different volatility, as described in our prior patent. For the latter use the tower or column preferably is considerably higher than where the apparatus is to be used for straight distillation purposes.

The oleaginous material which it is desired to treat is subjected to a continuous heating operation in the pipe still or tube heater indicated generally at 14. This tube heater may be of the type disclosed in our previous patent in which the material to be heated is passed at a rapid rate of travel through an enclosed zone or pipe subjected to a heated gas. The oil is heated to a temperature which is sufficiently high to vaporize the volatile constituents thereof at reduced pressure. In passing the oil through the tube heater 14 it is preferable to include steam along with the oil. For ordinary deodorization and removal of free fatty acids from the oils to be refined, it generally is sufficient if the oil is heated to a temperature of about 425° F. to 475° F. in the tube still 14, although higher or lower temperatures may be employed, depending upon the nature of the volatile impurities and other operating factors of the process such as the absolute pressure maintained in the system.

The heated oil and fatty acid mixture is introduced into the column 10 through a valve-controlled line 15. It will be noted that line 15 enters the column at a point almost at the top. From this point the oil flows downwardly across the bubble plates 11 against a countercurrent of superheated steam which is introduced at the bottom of the column through the line 16.

The top of the tower communicates with a barometric condenser (not shown) through the line 17 and the pressure within the column is reduced to the order of 5 mm. at the upper portion of the tower. The particular pressure in the column will depend upon operating conditions. As the line 16 preferably is open the tube still also may be maintained under reduced pressure.

After traversing the various bubble plates of the tower the oil is collected in the bottom of the column and may be drawn off through the bottom line 18.

The heat imparted to the oil by the heater 14 and the steam entering the column through line 16 causes the fatty acid constituents of the oil to be vaporized under the reduced pressure and to pass upwardly in the column. At the top of the tower there may be maintained one or more bubble plates upon which are collected liquid fatty acids maintained at a temperature below the distillation temperature of the fatty acids in the process. In the embodiment of the invention shown in the drawing the top three plates are shown to be of this nature. These plates, indicated at 19, 20 and 21, respectively, all may be employed for this purpose or any desired number may be so employed. The maintenance of cooled pools of previously condensed fatty acids on the plates 19, 20 and 21 is made possible by means of the outside cooling unit 22.

The upper bubble plate 19 is provided with a liquid receiver 23 beneath its down spout and this receiver communicates through valve controlled line 24 with the refrigeration unit 22. Bubble plate 21 likewise has a similar liquid receiver 25 which communicates with the line 24 through a valve controlled line 26. Liquid collecting on the plates 19, 20 and 21 passes into the liquid receivers 23 and 25 and from there into the upper portion of the refrigerating unit through line 26. In the lower portion of the refrigerating unit are a series of refrigeration coils 27 through which any desired type of refrigerants may be passed.

The top of the refrigerating unit 22 communicates with the top of the tower 10 through a line 28, this effecting an equalization of the pressure within the tops of the two units so that liquid may be transferred to and from the refrigerating unit without difficulty.

The bottom of the refrigerating unit 22 communicates through line 29 with a pump 30. This pump returns refrigerated liquid fatty acids from the refrigerating unit 22 through line 31 to the valve controlled inlets 32 and 33, serving plates 19 and 21, respectively. The number of plates utilized for condensation purposes may be determined by control of the valves in lines 32 and 33.

An extension 34 of the line 31 has mounted in it a valve 35, and this valve is operated through diaphragm 36. Diaphragm 36 is air-actuated by a constant level-maintaining device 37 which is of conventional construction and operates to maintain in the tank 22 a constant level of liquid fatty acids.

As oil is processed through the apparatus described there is an accumulation of liquid fatty acids on the plates 19, 20 and 21 due to condensation of the vaporous fatty acids by the cooled fatty acids on the plates. This condensation, together with the circulation of fatty acids to and from the refrigerator, causes an increase in volume of liquid on the plates and the excess liquid fatty acids overflows into the holders 23 and 25. From these holders the liquid fatty acids pass into the cooler 22 and are reduced in temperature to the desired extent. For example, the fatty acids on the plates 19, 20 and 21 may have a maximum temperature of 200° F. This temperature may be reduced by the refrigeration unit 22 to about 150° F., at which temperature the fatty acids are returned to the upper plates. The circulation is made sufficiently rapid to maintain the desired differential between the temperature of the liquid fatty acids on the plates 19 to 21 and the vaporous fatty acids passing upwardly from the oil.

As the vaporous fatty acids are contacted with the cooled liquid fatty acids on the upper plates in the tower the vapors are condensed without a corresponding condensation of the steam with which the fatty acids are mixed. The steam, along with a portion of noncondensible volatile odor-bearing impurities, passes out of the top of the column through line 17 to the barometric condenser, while the fatty acids are substantially entirely retained within the column. As the quantity of fatty acids accumulate in the refrigeration unit the valve 35 is operated by the liquid level control device 37 to pass the desired quantity of fatty acids to storage or to any other suitable source of disposition.

The temperature of the liquids on the upper plates of the tower is sufficiently low to condense substantially all of the fatty acid constituents of the oil. The odor-bearing substances for the most part will pass out of column with the steam, although a portion may be retained with the fatty acid fraction. In any event they will be removed from the product drawn from base of tower. This method of condensing fatty acid vapors is of great value from many standpoints. One of the advantages is that the barometric hot wells are relieved from the frothy emulsion of fatty acids which generally collect there and elsewhere in the previously known types of fatty acid distillation equipment. In the present type of deodorizers the fatty acids are condensed with the steam in barometric condensers. The fatty acids form some iron and calcium soaps causing emulsions. These emulsions must be periodically skimmed off of the hot wells and a great deal of water must be handled because of the emulsions. They must then be treated with acid in order to recover the grease. The recovered grease is a very low grade of material largely due to the high temperature and acid treatment that is required. With the new type of separator a fairly pure distilled fatty acid fraction would be obtained without further treatment.

In some cases the process and apparatus will be used in connection with materials having a sufficiently large content of fatty acids to make fractional distillation desirable. Where separation into fractions of different volatility is desired the heated oleaginous material may be passed from the tube heater 14 into a lower plate in the bubble tower, as, for example, through the line 38. The fractionation is effected as described in our patent by the return of a sufficient quantity of reflux composed of condensed low boiling fatty acids and by reboiling the reflux to provide for the desired separation into fatty acid fractions of different volatility. The refrigerating apparatus 32 is made of such sized capacity as to make it possible to return a relatively large quantity of the condensed fatty acids to the upper plates to act as reflux in this manner.

The heat necessary for the fractionation may be supplied at least in part by recycling the unsplit triglycerides obtained from the bottom of the tower and by the superheated steam used in the process. The heating operation in the case of fractionation generally will involve raising the temperature of the oleaginous material to a higher point than in the case of the deodorization and refining of an oil containing a relatively small quantity of fatty acids. Hydrolyzed triglycerides treated as by the Twitchell process may contain as much as 95 per cent or more of free fatty acids. To fractionate such fatty acids the heating operation may raise the temperature of the material to the order of 550° F. Steam at a temperature of about 500° F. may be passed through the heating tube with the fatty acid materials.

The heated mixture is flashed into the column and the fatty acid vapors pass upwardly through the bubble trays providing zones of previously condensed fatty acids of progressively decreasing vaporization temperatures. The quantity of liquid fatty acids returned to the column preferably is considerably greater than the quantity of such fatty acids removed from the process. The particular conditions of the fatty acid return will depend upon such factors as the number of fractions which the fatty acids are being divided into and the thoroughness of the separation desired. Higher boiling liquid fractions may be removed from any of the intermediate plates of the tower, and undistilled residue may be withdrawn from the bottom of the tower.

The absolute pressure at the top of the column may be between 5 and 35 mm. Hg, while at the vapor inlet it is desired to hold the pressure to between 30 and 65 mm. Hg. The withdrawal of liquid fatty acids from the upper plates of the column and refrigeration of these liquid low boiling fractions before returning the same to the tower in effect provides an internal condenser for the column. That is, the lower boiling fatty acids rising to the top of the column are condensed directly in the column to provide reflux liquid and to provide the means for condensing further quantities of the fatty acids.

The embodiment of the apparatus shown in Fig. 2 is particularly desirable for the refining and deodorization of batches of an oil such as palm oil, which usually will not contain a very great quantity of free fatty acids. Any desirable type of heating equipment may be employed to heat the oleaginous material to the extent necessary for vaporization of the free fatty acids and odor-imparting constituents. The heated material is subjected to a vaporization step for volatilization of the fatty acids and odor-imparting constituents with steam, the resulting vaporous mixture passing into the treating tank 40 through the inlet opening 41. A baffle 42 directs the vapors downwardly. Tank 40 is maintained under substantially reduced pressure by means of the line 43 leading to a suitable vacuum creating device.

In the bottom of the tank 40 are positioned a series of cooling coils 44 through which is passed a refrigerant such as water. Positioned above these coils and the inlet 41 is a bubble plate 45 having bubble caps 46 and a down spout 47 extending from the bubble cap to the lower portion of the tank. The liquid level in the tank 40 is maintained at the desired constant point by means of a conventional liquid level control device 48 which operates a motor 49 controlling a valve 50 located in the draw-off line 51. Communicating with the bottom of the tank is a line 52, and this line leads from the tank through the pump 53 to the line 51. The discharge pump 53 also communicates with a branch line 54, this branch line leading to the bubble plate 45, as shown in the drawing.

In operation of the device shown in Fig. 2 the vaporous mixture may enter the inlet 41 at a temperature of the order of 350° F. at 5-25 mm. Hg absolute pressure. Under the conditions of the process the vaporous material, including the free fatty acids, odor-imparting constituents and steam, pass upwardly through the bubble plate 45.

There is circulated across the bubble plate 45 chilled liquid fatty acids from the bottom of the tank. The pump 53 maintains a circulation of chilled liquid fatty acids through the line 54, across the bubble plate 45, down the downspout 47 and through the outlet opening 52. The rate of circulation of these liquid fatty acids and the degree to which their temperature is reduced are factors which provide for reduction of the temperature of the vaporous fatty acids passing upwardly through the bubble plate 45 sufficiently to condense these fatty acids. The condensed fatty acids then join the circulating stream. As the liquid fatty acids accumulate, they are withdrawn through the line 51 to an extent determined by the liquid level control device 48.

The refrigeration coils cool the liquid fatty acids in the bottom of the tank to a temperature of the order of 150° to 175° F. and the liquid fatty acids are poured onto the bubble tray at a corresponding temperature. The rate of circulation is such that a maximum temperature of about 200° F. is reached as the liquid fatty acids pass from the line 54 across the bubble plate to the downspout 47. As the vaporous fatty acids enter the tank in admixture with superheated steam, the steam passes upwardly through the bubble tray and out the line 43. To prevent incorporation of mist in this steam it is preferable to provide a Venetian blind type of mist extractor 55 in the upper portion of tank 40.

A mixture of fatty acid vapors and steam presents a particular problem from the standpoint of liquefying the fatty acids. The particle size of the fatty acids when the vapor temperature is reduced below the condensation point of the fatty acids is so small that the liquid particles tend to be carried along with the vapor stream, thereby making separation into liquid fractions extremely difficult.

In an example of refining palm oil approximately 600 pounds of steam is blown into the charge of palm oil per hour and 6 hours may be necessary for completing the refinement of the oil by elimination of fatty acids and odoriferous materials. The final temperature of the charge may be of the order of 420° F., and the quantity of the oil of the order of 15,000 pounds. As this oil contains approximately 7 per cent of free fatty acids, it is required that 1050 pounds of fatty acids must be removed. By far the greatest portion of this acid is removed during the first two hours. The mixture of fatty acids and steam may enter the vapor separator at about 350° F. and a pressure of 5-25 mm. of mercury. The refrigeration of the liquefied fatty acids and circulation in the separator is controlled to reduce the temperature from 350° F. to approximately 200°

F. on the bubble tray. This necessitates removal of the heat of condensation of the fatty acids together with sensible heat in condensed liquid fatty acids and the steam. The quantity of fatty acids removed per hour determines the circulation rate of the cooled fatty acids. In the above example where the fatty acids are being removed at the rate of 500 pounds of acid per hour, it will be necessary to circulate about 6600 pounds per hour of cooled fatty acids having an inlet temperature of 150° F. and an outlet temperature at 47 of 200° F.

In each of the types of apparatus shown in the drawing it will be noted that there is provided a process for the condensation of vaporous fatty acids from a mixture of fatty acids and steam, the process involving reduction of the temperature of the vaporous fatty acids to below their condensation temperature by contact thereof with previously condensed and chilled fatty acids of similar nature. As has been described, this process may be utilized in the straight run distillation of fatty acids, in the refining of residual fatty acids and odoriferous-imparting substances as impurities in oil, and in general is applicable to the condensation of fatty acids from a mixture thereof with steam. The process has many advantages over other types of heat exchange condensation processes. It will be recognized that the process and apparatus may be varied somewhat from the explanative description given without departing from the scope of the invention as defined in the appended claims. As an example of permissible changes, more than one bubble tray may be employed in the apparatus of Fig. 2. It will be observed that in each of the modifications shown in Figs. 1 and 2 the acids of the upper zone are cooled by being passed into indirect heat exchange relation with a cooling fluid. By the term "indirect heat exchange relation" we mean the acids are in contact with a conduit carrying the cooling fluid, like is shown in Figs. 1 and 2, or are otherwise in heat transfer relation while avoiding direct admixture with the cooling fluid.

The odoriferous materials are volatile, usually more volatile than the fatty acids and are therefore carried out by the steam, although a portion may condense with the condensed fatty acids on the upper plate across which refrigerated liquid fatty acids are circulated. The steam passing through the circulating fatty acids has a stripping effect upon the volatile odoriferous materials, thereby preventing undue accumulation of odor-imparting impurities in the fatty acids and permitting the recovery of a relatively pure and odor-free fatty acid product. Thus, in the refining and deodorization of a vegetable oil in the apparatus of Fig. 1, steam passes upwardly through the oil from the base of the tower and with the vaporized fatty acids and odor-imparting materials passes to a condensing zone where the vaporous fatty acids are liquefied and recirculated. Most of the odor-imparting materials will be stripped out and carried along with the steam, leaving a thoroughly deodorized oil and a liquid fatty acid product.

We claim:

1. A process of treating oleaginous materials containing free fatty acids comprising vaporizing volatile constituents of said materials in the presence of steam to thereby form a vaporous mixture including fatty acids and steam, passing said vaporous mixture into a zone containing previously condensed fatty acids where said vaporous mixture comes into contact with said condensed fatty acids, passing liquid fatty acids from said zone into indirect heat exchange relation to a cooling fluid to maintain the liquid fatty acids in said zone at a temperature below the condensation temperature of said vaporous fatty acids and above the condensation temperature of said steam whereby to condense said vaporous fatty acids in said zone and to pass said steam from said zone in vaporous form, and recovering liquid fatty acids from said zone.

2. A process of treating oleaginous materials containing fatty acids and low boiling odor-imparting substances, comprising vaporizing volatile constituents of said materials in the presence of steam to thereby form a vaporous mixture including free fatty acids, odor-imparting constituents, and steam; passing said vaporous mixture into a zone containing previously condensed fatty acids where said vaporous mixture comes into contact with said condensed fatty acids; circulating liquid fatty acids from said zone into indirect heat exchange relation to a cooling fluid to maintain the liquid fatty acids in said zone at a temperature below the condensation temperature of said vaporous fatty acids and above the condensation temperature of said steam and odor-imparting substances whereby to condense said vaporous fatty acids and to pass said steam and substantial amounts of said substances form said zone in vaporous form, and recovering liquid fatty acids from said zone.

3. A process of deodorizing glycerides containing free fatty acids and low boiling odor-imparting substances, which comprises vaporizing in the presence of steam fatty acids and odor-imparting substances contained in said glycerides, separating the vaporous mixture thus produced from said glycerides, passing said vaporous mixture into a zone containing previously condensed fatty acids of similar nature, where said vaporous mixture comes into contact with said condensed fatty acids; circulating the liquid materials in said zone into indirect heat exchange relation to a cooling fluid to maintain the temperature of said liquid materials in said zone below the condensation temperature of the vaporous fatty acids and above the condensation temperature of said steam, whereby to condense said vaporous fatty acids in said zone and to pass said steam from said zone in vaporous form.

4. A process of treating oleaginous materials containing fatty acids, comprising passing said materials downwardly through a lower series of zones against a countercurrent of steam whereby fatty acids are carried upwardly in vaporous form in admixture with said steam, passing said vaporous mixture through an upper zone containing similar previously condensed fatty acids, where said vaporous mixture comes into contact with said condensed fatty acids, circulating liquid fatty acids from said upper zone into indirect heat exchange relation to a cooling fluid to maintain the liquid fatty acids in said zone at a temperature below the condensation temperature of said vaporous fatty acids and above the condensation temperature of said steam whereby to condense said vaporous fatty acids without condensing said steam, and recovering condensed fatty acids from said upper zone.

RALPH H. POTTS.
JOHN E. McKEE.